US007248454B2

(12) United States Patent
Takayanagi

(10) Patent No.: US 7,248,454 B2
(45) Date of Patent: Jul. 24, 2007

(54) STATIC ELIMINATOR

(75) Inventor: Makoto Takayanagi, Hamamatsu (JP)

(73) Assignee: Trinc.org, Shizuoka-pref. (JP)

( * ) Notice: Subject to any disclaimer, the term of this patent is extended or adjusted under 35 U.S.C. 154(b) by 358 days.

(21) Appl. No.: 10/764,027

(22) Filed: Jan. 23, 2004

(65) Prior Publication Data

US 2005/0018375 A1 Jan. 27, 2005

(30) Foreign Application Priority Data

Jul. 22, 2003 (JP) ............................. 2003-277239
Jan. 5, 2004 (JP) ............................. 2004-000040

(51) Int. Cl.
*H02H 1/00* (2006.01)

(52) U.S. Cl. ...................................................... 361/212

(58) Field of Classification Search ................ 361/212, 361/220

See application file for complete search history.

(56) References Cited

U.S. PATENT DOCUMENTS

| | | | | |
|---|---|---|---|---|
| 4,216,518 | A * | 8/1980 | Simons | 361/213 |
| 5,402,157 | A * | 3/1995 | Nagato et al. | 347/122 |
| 6,647,242 | B2 * | 11/2003 | Gagnon et al. | 399/390 |
| 6,952,555 | B2 * | 10/2005 | Oh et al. | 399/390 |

* cited by examiner

*Primary Examiner*—Stephen W. Jackson
*Assistant Examiner*—Boris Benenson
(74) *Attorney, Agent, or Firm*—Leighton K. Chong

(57) ABSTRACT

There is provided a static eliminator which comprises an ion generating portion in the form of tape. There is also provided a self-discharged static eliminator comprising an conductor provided with discharge whiskers in which the conductor is applied with a predetermined voltage. There is also provided a DC type of self-discharged fiber-like static eliminator which comprises plus fiber electrodes applied with plus voltage, minus fiber electrodes applied with minus voltage, a support disposed between the plus and minus electrodes for supporting the plus and minus electrodes and provided with insulation reserving member for preventing the spark discharge or short due to the access of the plus and minus electrodes.

8 Claims, 31 Drawing Sheets

PRIOR ART

PRIOR ART

STATIC ELIMINATOR

TECHNICAL FIELD

This invention generally relates to a static eliminator, and more particularly, to a tape type of static eliminator and a self-discharged static eliminator.

BACKGROUND OF INVENTION

From the viewpoint of construction, the ion generating portion of the conventional static eliminators are shaped in the form of box or rod.

From the viewpoint of discharge property, there is a self-discharged static eliminators. The self-discharged static eliminator uses conductive thin fibers. The discharge occurs from the leading ends of the fibers when the difference of static potential between the fibers and the object to be discharged or the fibers themselves rises above a certain value, which results in the cut-down of static electricity of the charged object. The self-discharged static eliminator is used to discharge static electricity of the charged objects by approaching the static eliminator to the charged objects. The operators in the factory wear the self-discharged static eliminators to discharge the static electricity from themselves and cut down the charge.

Since the ion generation portion of the static eliminator of the former is shaped in the form of box or rod, a large space is required to install it. Therefore, since the static eliminator can not be installed in the machine or in the narrow gap, the static electricity can not be eliminated in the area of static generation.

With the self-discharged static eliminator of the latter, the self-discharge does not occur until static electricity is accumulated and then static potential difference goes over a certain value, about 700 V, and the self-discharge stops when static potential difference goes below the certain value, about 700 V, and therefore the residual static electricity of about 700 V always remains.

FIG. 18 shows a conventional self-discharged static eliminator. A self-discharged static eliminator 300 comprises a line-like or rod-like conductor or a plate-like or fiber-like conductor body 302 provided with whisker-like conductors 304, and is called “eliminator brush” or “arm band”. The eliminator brush is not necessary to have electronic device separately and can eliminate static electricity. That is, without application for energy from the outside, the eliminator can discharge static electricity and therefore is called self-discharged static eliminator.

On the principle of operation, when the eliminator brush is disposed opposite to the objective 306 to be discharged such as a work made of paper, film, or sheet, and then the distance D is shorten, the electric field on the leading ends of whisker conductors become large and then insulation of air can be held. Finally, corona discharge starts and then air ions in the opposite polarity of the work are induced.

FIG. 19 shows a graph of elimination property of a conventional self-discharged static eliminator. The curve line indicated at “static elimination property of prior art” on the graph shows that when the elimination brush is approached to the work bearing static potential of 5 kV, the corona discharge starts and the static potential gradually decreases. When the static potential decreases to about 1 kV, the electric field on the leading ends of whiskers of static eliminator is weaken and finally the corona discharge stops. Since at that time static elimination ends, the static electricity is not completely eliminated and the residual static electricity of about 1 kV remains.

It is desirable that static elimination is made enough to eliminate residual static electricity as shown by the curve line indicated at “static elimination property of invention” in FIG. 19.

With the fiber-like static eliminator as shown in FIG. 8, plus electrodes and minus electrodes are arranged in line, respectively. These electrodes are not disposed oppose to each other and are disposed in zigzag. In this case, since, for example, each of minus electrodes is equally applied with sucking force from plus electrodes on both sides, the leading ends of electrodes are not approached, and thus spark discharge or short due to approaching of electrodes does not occur.

However, with the conventional DC type of fiber-like static eliminator as shown in FIG. 31 in which a multiplicity of fiber electrodes are disposed in parallel on support on its opposite sides, if the discharge electrodes project from the end of support, the leading ends of discharge electrodes approach to each other due to static force, which would result in the spark discharge or short.

More specifically, referring to FIG. 31, a fiber-like static eliminator 210 comprises a multiplicity of plus fiber electrodes 214 and a multiplicity of minus fiber electrodes 216 disposed in parallel on support 212 on its opposite sides. Both electrodes 214 and 216 are power supplied from conducting electrodes 218, and the leading ends of plus and minus electrodes 214 and 216 project from the end of the support 212.

Therefore, it is an object of the present invention to provide a tape type of static eliminator which can be installed in a small space or gap and does not generate the stoppage of discharge even when the static potential goes down below about 700 V.

It is anther object of the present invention to provide a self-discharged static eliminator, hereinafter referred as to “static eliminator” or “eliminator brush” which can eliminate static electricity with ease by small power until the residual static electricity is removed.

It is a further object of the present invention to provide a DC type of fiber-like static eliminator which prevents spark discharge or short.

SUMMARY OF INVENTION

To accomplish the objects, there is provided a static eliminator which comprises ion generating portion in the form of tape.

There is also provided a self-discharged static eliminator comprising conductors provided with discharge whiskers in which voltage is applied to conductors.

There is also provided a DC type of fiber-like self-discharged static eliminator which comprises plus fiber electrodes supplied with plus voltage, minus fiber electrodes supplied with minus voltage, and a support disposed between plus fiber electrodes and minus fiber electrodes for supporting these fiber electrodes and provided with an insulation reserving mean for preventing the spark discharge or the short due to access of electrodes.

Other objects, features, and advantages of the present invention will be explained in the following detailed description of the invention having reference to the appended drawings:

DETAILED DESCRIPTION OF THE INVENTION

FIRST EMBODIMENT

Figure 1:
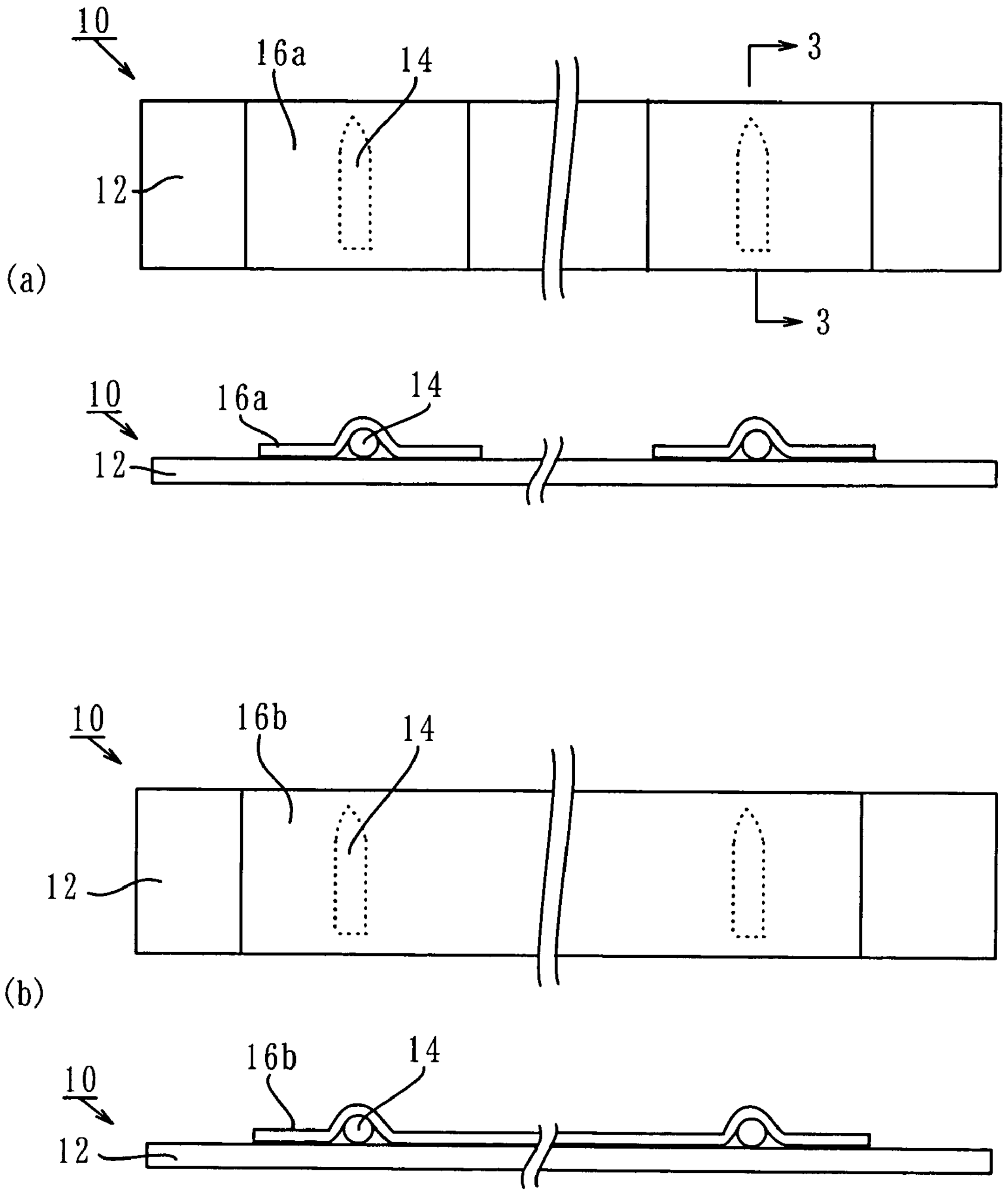
FIG. 1 shows a tape type of static eliminator in accordance with the first embodiment of the present invention.

FIG. 1 shows a tape type of static eliminator in accordance with the first embodiment of the present invention. In FIG. 1 a tape-type static eliminator, specifically, a tape-type ion generator of the static eliminator 10 includes a plurality of discharge electrodes 14 for generating ions on a narrow thin board tape 12. Each discharge electrode 14 is disposed in parallel on the board tape 12 and the discharge end of each discharge electrode 14 is oriented in a direction to issue ions from one side of the board tape 12. Since the discharge electrodes are applied with high voltage such as above several kV, it is preferred that a plurality of short cover tapes 16*a* as shown in FIG. 1*a* or an elongated cover tape as shown in FIG. 1*b* are provided for covering over the discharge electrodes 14. The discharge electrodes 14 are is power supplied by conductor or electric supply line, not shown in FIG. 1, through a high voltage generating device, not shown, from a power supply, not shown.

The board tape 12 is of any proper insulating material and may be rigid or flexible in its stiffness. However, the flexible material is preferable because of usability. The cover tape 16 (16*a* or 16*b*) is of any flexible insulating material.

This tape type of static eliminator 10 is not required for large space for installation and can be installed in a narrow space since it is narrow and thin. Therefore, the static eliminator can eliminate static electricity on the site of static electricity occurrence within a machine or a device immediately after its occurrence and thus can prevent problems induced from the static electricity.

As another merits, when the board tape 12 of flexible material is used it can be installed in conformity to the three dimensional structure of the object to be discharged since the board tape 12 can be bent freely. Thus, the static eliminator can issue ions from the best position for elimination in accordance with the object to be discharged, and therefore highly effective elimination is possible.

SECOND EMBODIMENT

Figure 2:
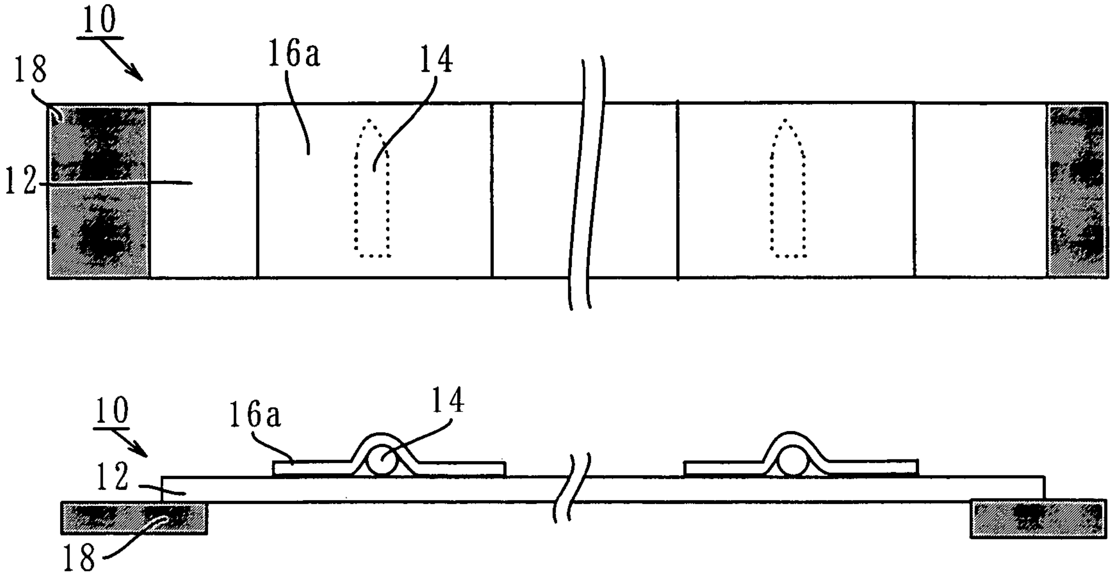
FIG. 2 shows a tape type of static eliminator in accordance with the second embodiment of the present invention.

FIG. 2 shows a tape type of static eliminator in accordance with the second embodiment of the present invention. In case that the ion generating portion is in the form of tape and is flexible, the static eliminator can be suspended on opposite ends by pulling it. In such a case, only holders 18 provided on the opposite ends are required for pulling. Therefore, a support for supporting ion generating portion from its rear side is not necessary. Furthermore, the problem in that the support absorbs ions can be solved. Although the short cover tapes 16*a* is shown in FIG. 2, the elongated cover tape 16*b* may be used.

THIRD EMBODIMENT

Figure 3:
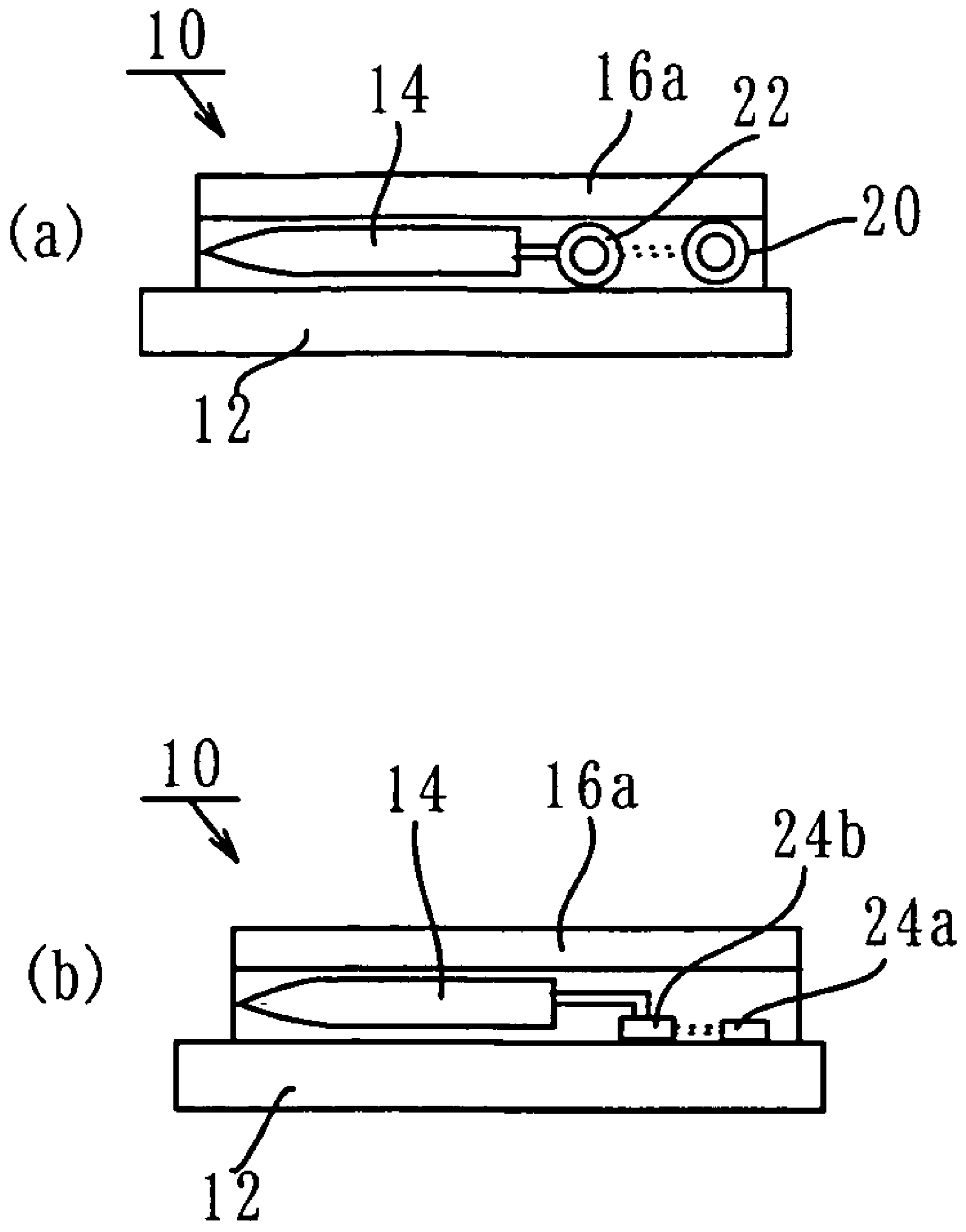
FIG. 3 shows a tape type of static eliminator in accordance with the third embodiment of the present invention.

FIG. 3 shows a tape type of static eliminator in accordance with the third embodiment of the present invention. FIG. 3*a* and FIG. 3*b* are cross sectional views along lines 3—3 of FIG. 1. In FIG. 3*a*, conductors 20 and 22 are used for supplying electric power to discharge electrodes 14. The conductors 20 and 22 generate plus ions and minus ions, respectively, and power supply to each discharge electrode 14 is carried out by connecting its terminal and conductor 20 or 22. These conductors 20 and 22 are supplied with power from a high voltage generating device, not shown. In FIG.

3*b*, the board tape 12 itself is an electronic circuit board with an electronic circuit pattern which supplies power to the discharge electrodes. As a circuit pattern, portions 24*a* and 24*b* corresponding to the conductor or power supply line are provided. In this manner, in case that the electronic circuit pattern is provided, FPC or flexible print circuit, or FFC or flexible flat cable may be used.

4th EMBODIMENT

Figure 4:
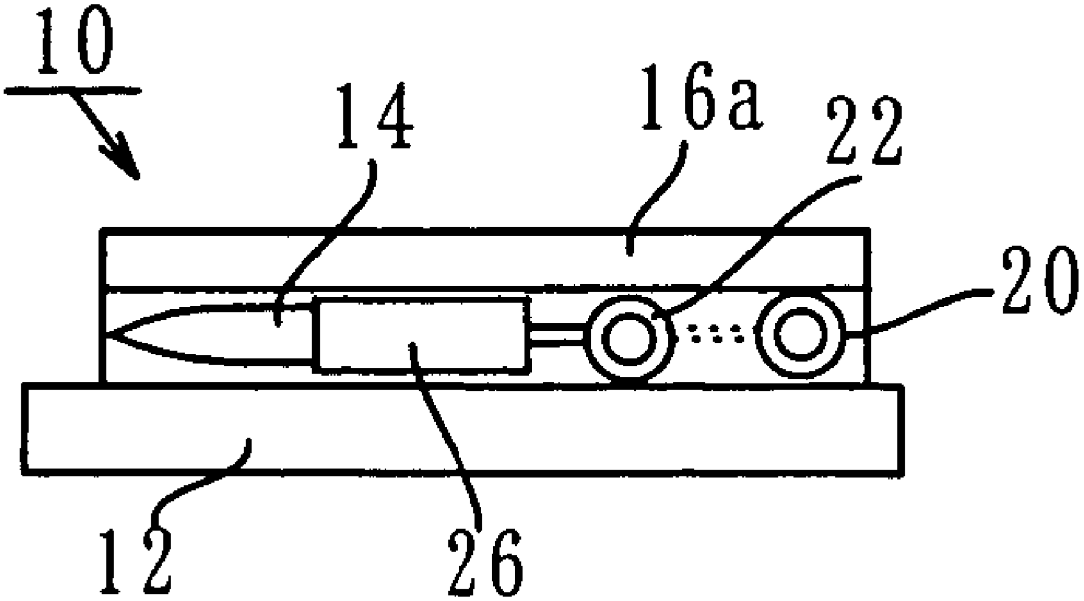
FIG. 4 shows a tape type of static eliminator in accordance with the 4th embodiment of the present invention.

FIG. 4 shows a tape type of static eliminator in accordance with 4th embodiment of the present invention. In this embodiment, discharge electrodes are mounted in sockets 26. In this case, discharge electrodes are exchangeable and thus their maintenance is easy.

5th EMBODIMENT

Figure 5:
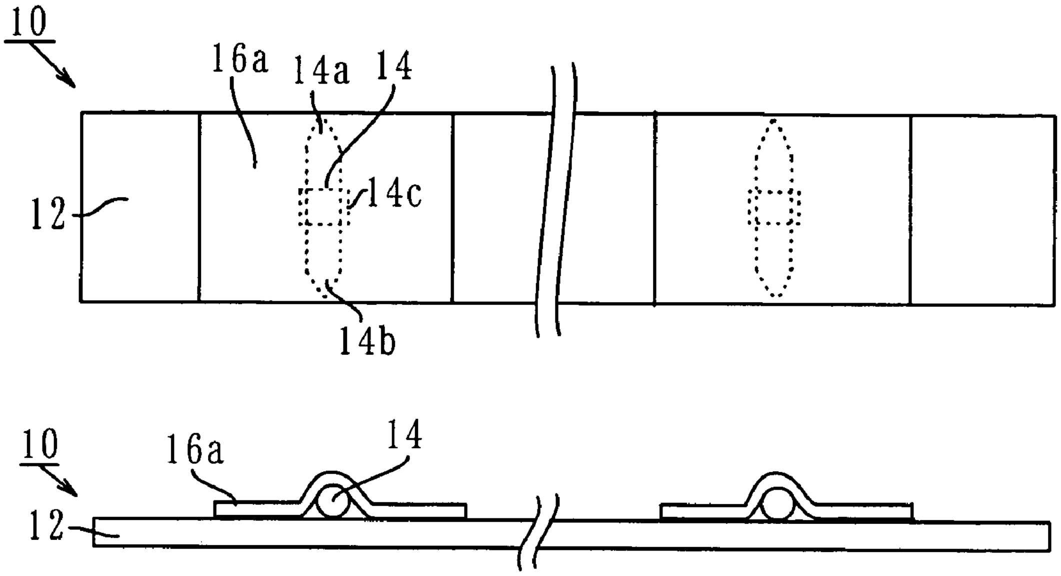
FIG. 5 shows a tape type of static eliminator in accordance with the 5th embodiment of the present invention.

FIG. 5 shows a tape type of static eliminator in accordance with 5th embodiment of the present invention. In this embodiment, discharge electrode 14 is formed with discharge leading ends 14*a* and 14*b* at its opposite ends to issue ions from the opposite sides of the board tape 12. Alternatively, the discharge electrode with discharge leading end 14*a* and discharge electrode with discharge leading end 14*b* are disposed in opposite directions. With this tape type of static eliminator, it can be used to discharge static electricity on the opposite sides in a narrow space.

6th EMBODIMENT

Figure 6:
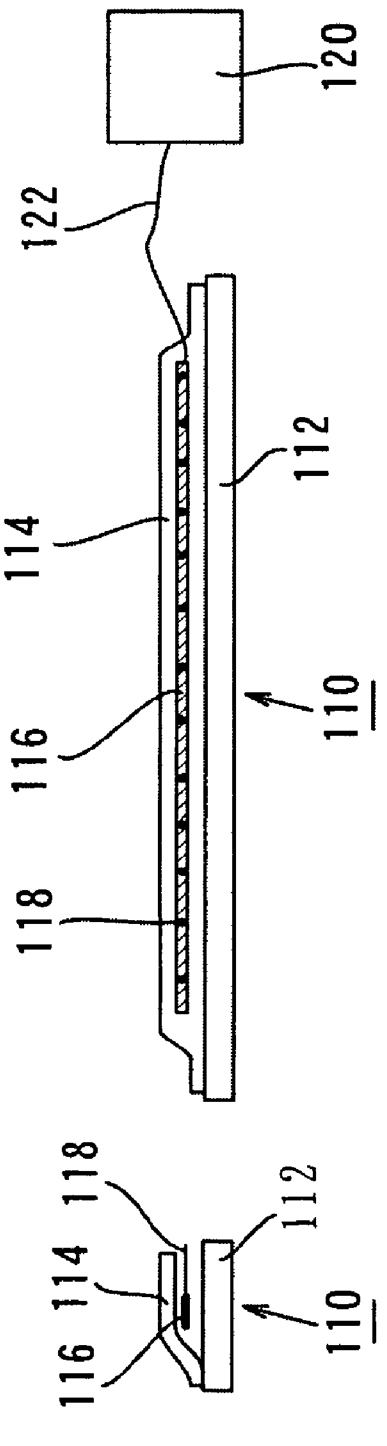
FIG. 6 shows a static eliminator in accordance with the 6th embodiment of the present invention in a plan view and a side view.
Figure 19:
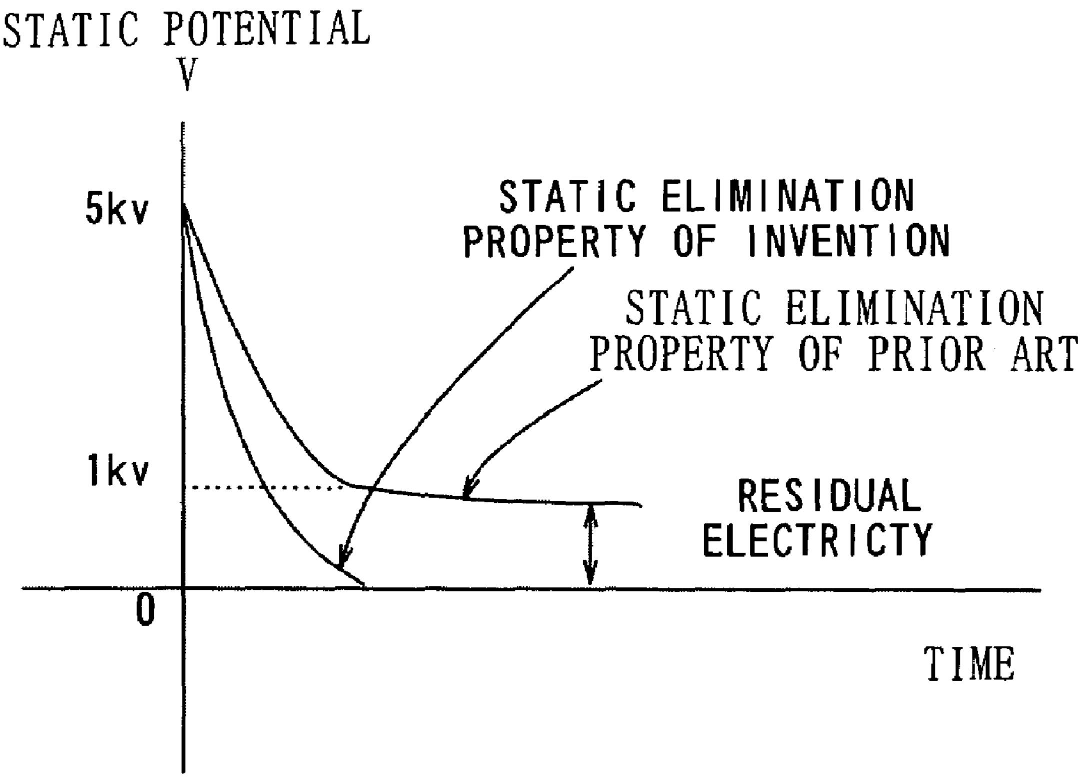
FIG. 19 is a graph showing elimination properties of a conventional static eliminator and a static eliminator in accordance with the present invention.

FIG. 6 shows a prototype of static eliminator in accordance with 6th embodiment of the present invention. One of more specific embodiments 7–9 described later is used in response to the property of applied voltage. An eliminator brush 110 comprises a base tape 112, whisker shaped conductors or whisker electrodes 118, a conductor 116 provided with the whisker conductors 118 so that the whisker conductors 118 are disposed in parallel to be orientated in a direction, and a cover for covering the conductor 116 and whisker conductors 118. The conductor 116 of the eliminator brush 110 is connected with electronic device or body 120 by conductor 122 to be applied with voltage from the body 120. The eliminator brush 110 is covered by insulating cover 114. It is preferable that the applied voltage is near the residual electricity as shown in FIG. 19. Although the reason will be described in detail later, when the voltage near the residual electricity is applied, in case that the work, not shown, is not charged with static electricity, the eliminator brush does not discharge and ions are not issued. However, the discharge starts just at the moment when the work is charged even if only slightly and the ions in opposite polarity of charged work are issued and the discharge is made.

If the eliminator brush 110 is being applied with the voltage higher than the residual electricity, the full-time discharge continues to be made from the eliminator brush 110. This is of no use in a sense. However, because of full-time discharge, if charged only slightly, a quantity of discharge is adjusted with high sensitivity and thus a rapid and high accurate operation of discharge can be realized.

7th EMBODIMENT

Figure 7:
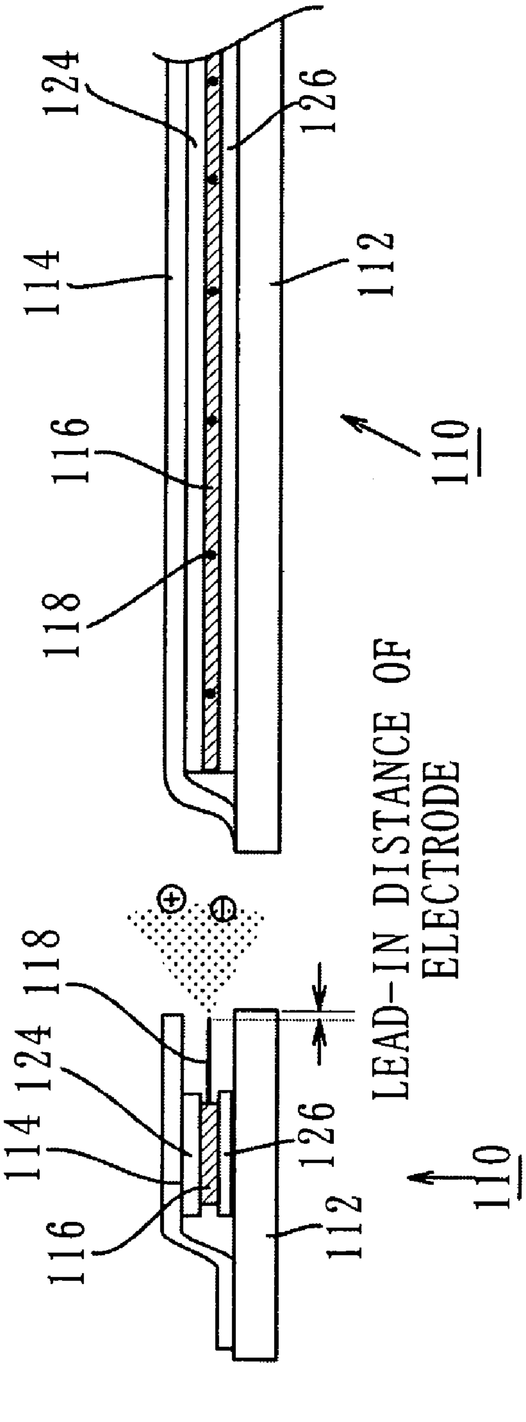
FIG. 7 shows a static eliminator in accordance with the 7th embodiment of the present invention in a plan view and a side view.

FIG. 7 shows a static eliminator in accordance with 7th embodiment of the present invention. In FIG. 7 a static eliminator is of AC type. With the AC type of static eliminator, one eliminator brush (conductor 116 and array of discharge whiskers 118) is held by spacers 124, 126 and covered by the cover 114 to be insulated from the outside. The eliminator brush is preferably formed on a base tape 112, which can be easily handled. Since the eliminator brush would touch the work and be charged if the leading ends of whiskers projects from the base tape, it is preferable that the whisker is led in from the base tape and does not touch the work directly. The brush eliminator is applied with voltage, for example, AC 1 kV relatively lower than the applied voltage such as AC 5 kV–10 kV used in the conventional static eliminator.

8th EMBODIMENT

Figure 8:
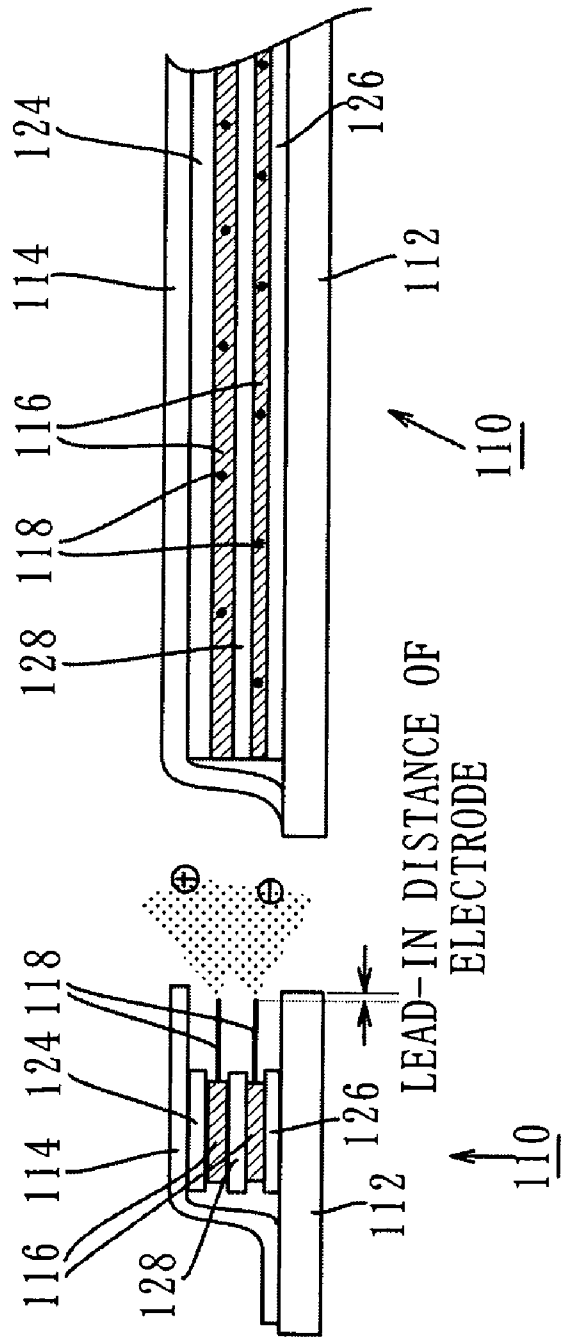
FIG. 8 shows a static eliminator in accordance with the 8th embodiment of the present invention in a plan view and a side view.

FIG. 8 shows a static eliminator in accordance with 8th embodiment of the present invention. This eliminator is of a DC type. The eliminator has two eliminator brushes. The brushes are applied with a voltage, for example, DC 1 kV relatively lower than the applied voltage such as DC 5 kV–10 KV used in the conventional static eliminator. One brush is applied with voltage of plus polarity and the other brush is applied with voltage of minus polarity. It is preferable that whiskers of each brush are disposed in zigzag manner. Furthermore, these brushes are isolated and electrically insulated from each other by spacer 128. These brushes are mounted on the base tape and are insulated by the cover 114, which can be easily handled. Since the eliminator brush would touch the work and be charged if the leading ends of whiskers projects from the base tape, it is preferable that the whisker is led in from the base tape and does not touch the work directly.

9th EMBODIMENT

Figure 9:
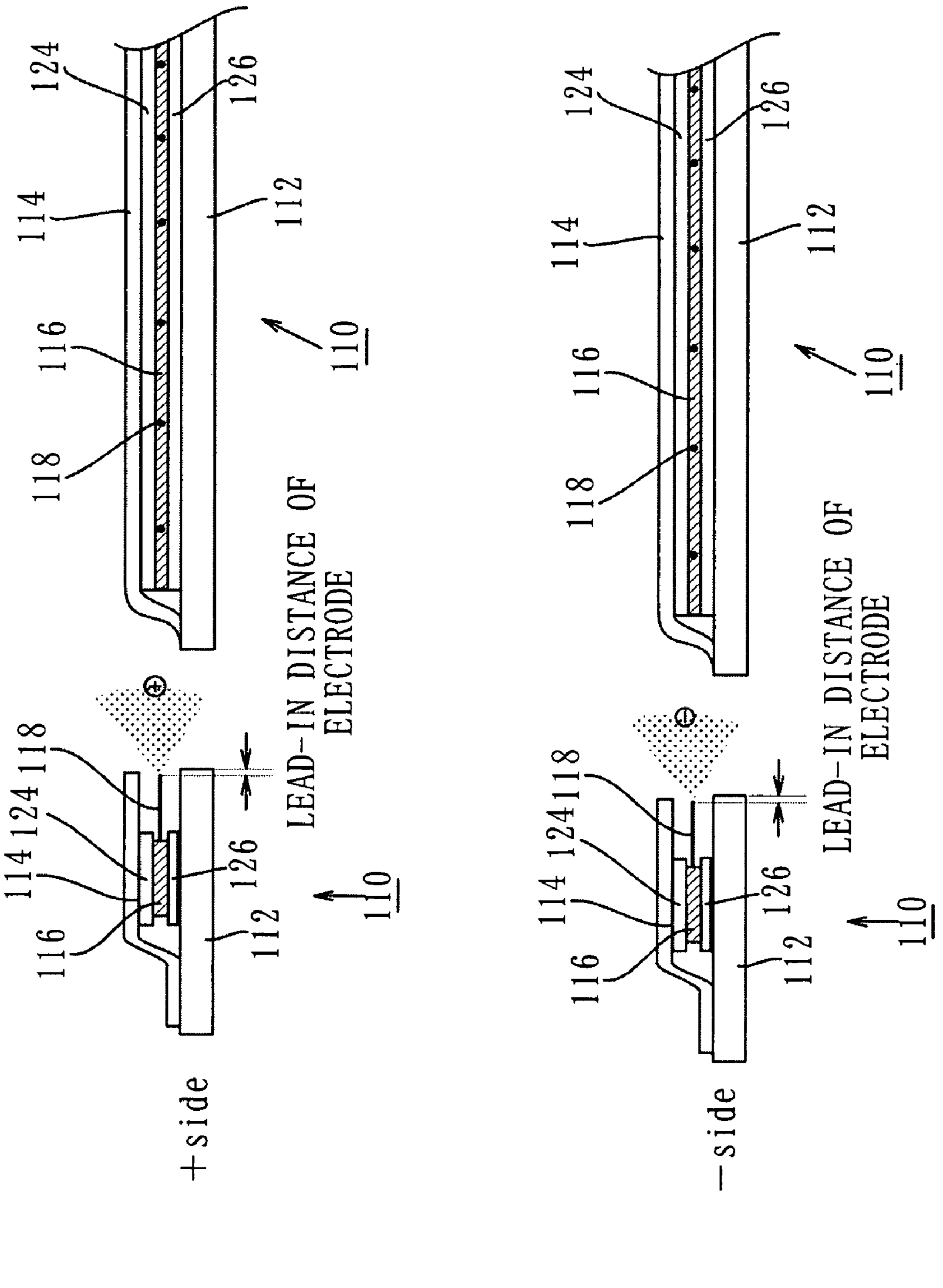
FIG. 9 shows a static eliminator in accordance with the 9th embodiment of the present invention in a plan view and a side view.

FIG. 9 shows a static eliminator in accordance with 9th embodiment of the present invention. In the embodiment, an eliminator brush 110 of plus polarity and an eliminator brush 110 of minus polarity are separately provided. The eliminator brush is different from that of the 8th of embodiment in that no intermediate spacer 128 is provided, but the other construction is similar to that of the 8th of embodiment.

Figure 10:
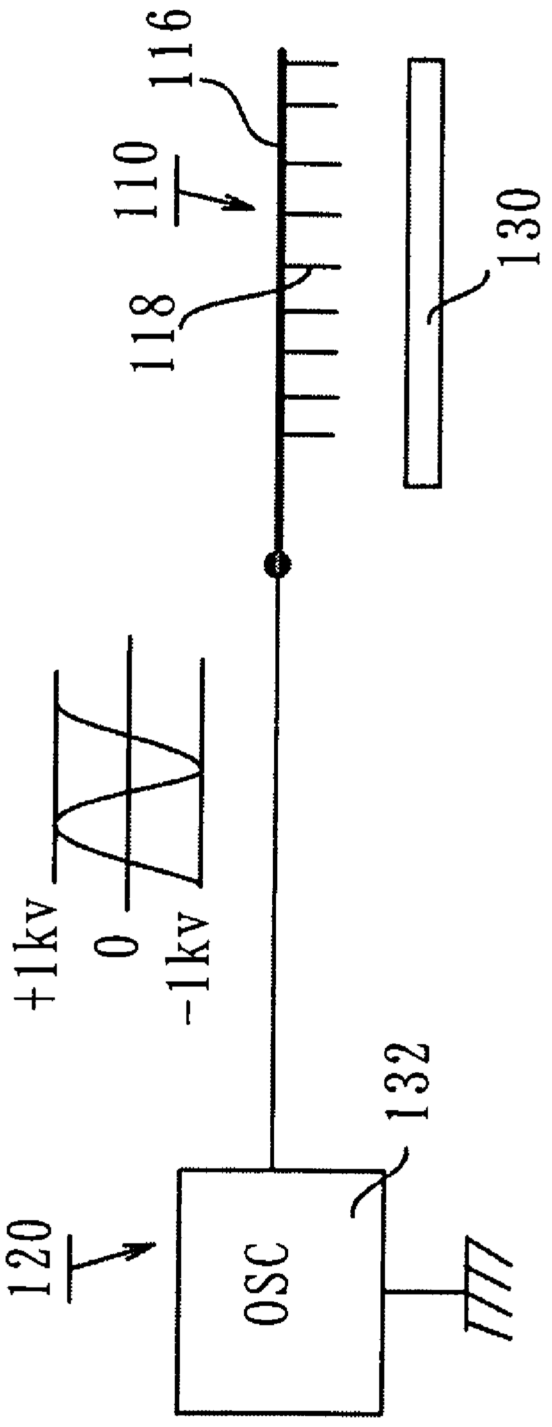
FIG. 10 is a diagrammatic view of an electronic circuit of AC type of static eliminator.
Figure 11:
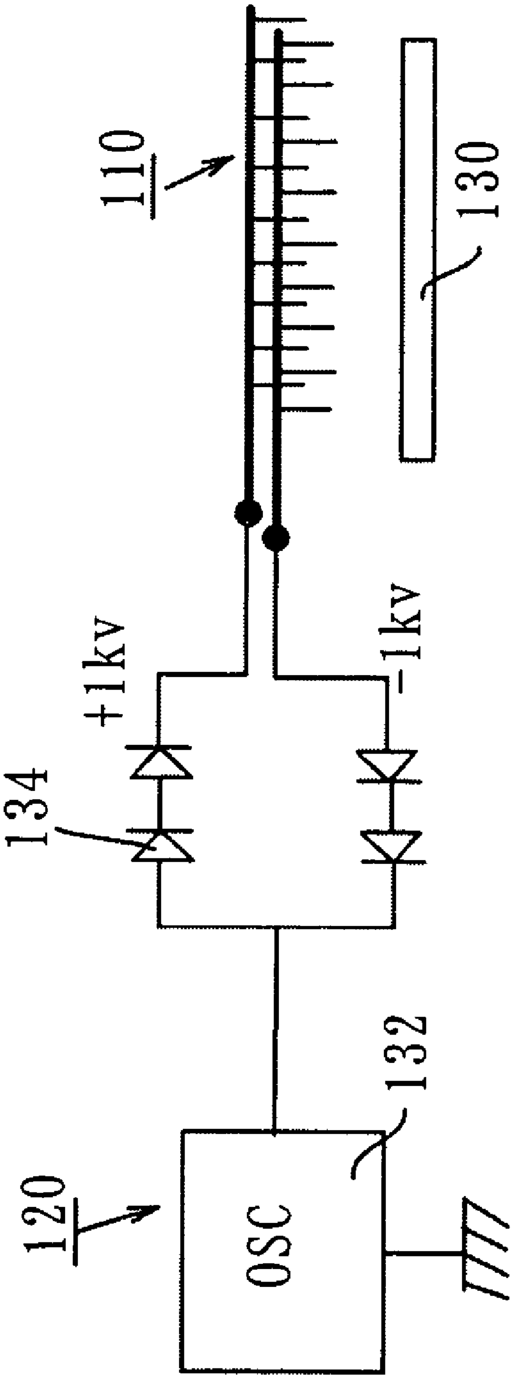
FIG. 11 is a diagrammatic view of an electronic circuit of DC type of static eliminator.

FIGS. 10 and 11 diagrammatically shows an electronic circuit according to the present invention. FIG. 10 shows the electronic circuit applied for the AC type of static eliminator and FIG. 11 shows the electronic circuit applied for the DC type of static eliminator.

With the AC type of static eliminator, an oscillator OSC 132 provided in the electronic device 120 generates an alternate voltage. Although its oscillating frequency may be 50/60 Hz of commercial power, the transformer becomes large. Therefore, it is preferable that several 10 kV of frequency is used for miniaturization. The voltage generated by oscillator is boosted to the order of the above-mentioned residual static potential, for example, 1 kV. The work which is discharged by the eliminator 110 is indicated at 130.

With the DC type of static eliminator, an oscillator OSC 132 generates an alternate voltage. The alternate voltage is rectified by a rectification circuit and boosted to generates plus DC and minus voltages on the order of the above-mentioned residual static potential, for example, 1 kV. These voltages are applied to separate static eliminators.

Now referring to FIGS. 12 and 13, a principle of operation will be explained. The AC type will be explained with reference to FIG. 12 and the DC type will be explained with reference to FIG. 13. The static potential is on axis of ordinate of the graph and time is on axis of abscissas of the graph.

Figure 12:
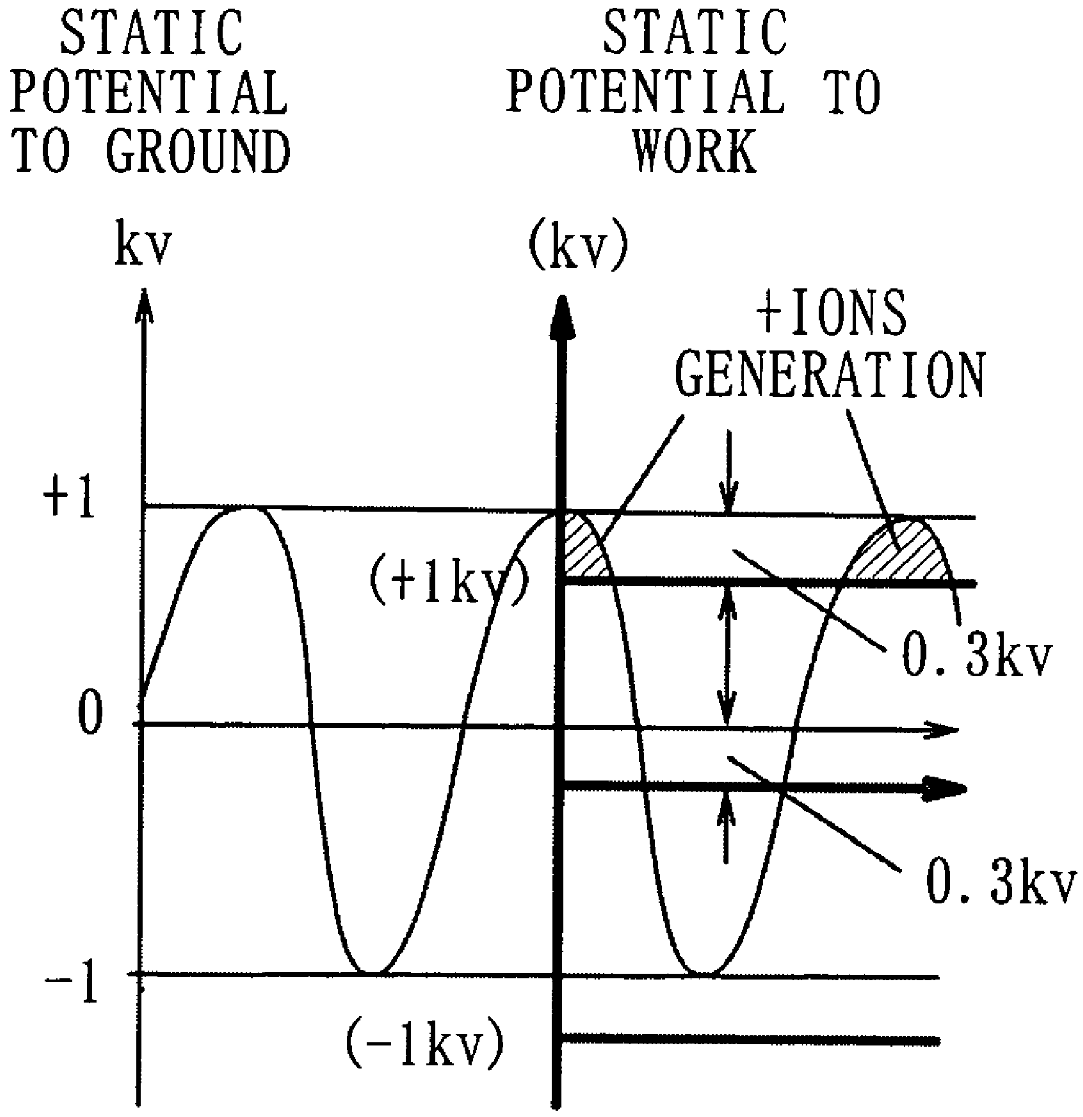
FIG. 12 is a graph for explanation of the principle of operation of AC type of static eliminator.

In FIG. 12 the alternate voltage in which its peak voltage is ± 1 kV static potential to ground is applied. At the moment when the work charged with 0.3 kV appears near the eliminator brush, during half positive cycle the potential difference between the eliminator brush and the work increases by 0.3 kV to 1.3 kV. Since the potential difference rises beyond the discharge halt voltage of 1 kV, the electric field becomes stronger and thus the discharge of plus ions starts, which leads to neutralization of minus charge of 0.3 kV. In the meantime, during half negative cycle the potential difference between the eliminator brush and the work decreases by 0.3 kV to 0.7 kV. Since the charge of 0.7 kV is below the discharge halt voltage of 1 kV, the electric field becomes weaker and thus the discharge of minus ions does not occur.

Figure 13:
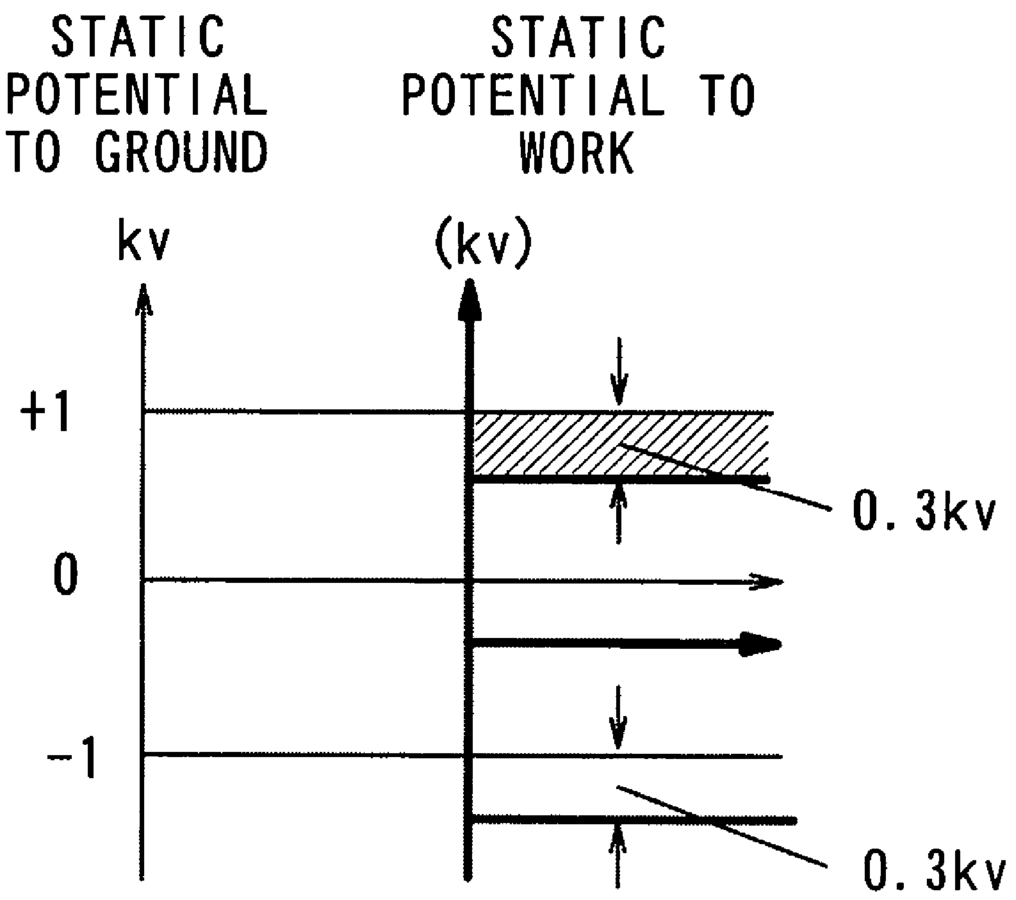
FIG. 13 is a graph for explanation of the principle of operation of DC type of static eliminator.

In FIG. 13 the DC voltages in which ± 1 kV static potentials to ground are applied. At the moment when the work charged with 0.3 kV appears near the eliminator brush, the potential difference between the positive eliminator brush and the work increases by 0.3 kV to 1.3 kV. Since the potential difference rises beyond the discharge halt voltage of 1 kV, the electric field becomes stronger and thus the discharge of plus ions starts, which leads to neutralization of minus charge of 0.3 kV. In the meantime, the potential difference between the negative eliminator brush and the work decreases by 0.3 kV to 0.7 kV. Since the charge of 0.7 kV is below the discharge halt voltage of 1 kV, the electric field becomes weaker and thus the discharge of minus ions does not occur.

With the conventional eliminator brush, when static electricity goes below 1 kV, the discharge halts, and a further elimination can be not made. Consequently the residual static electricity of 1 kV remains. On the other hand, in the invention since the eliminator brush is applied with the discharge halt voltage such as 1 kV, the discharge starts and neutralizes the static electricity which the work bears just at the moment when the work is charged with static electricity. Of course when the work bears no static electricity no or little discharge occurs.

10th EMBODIMENT

Figure 14:
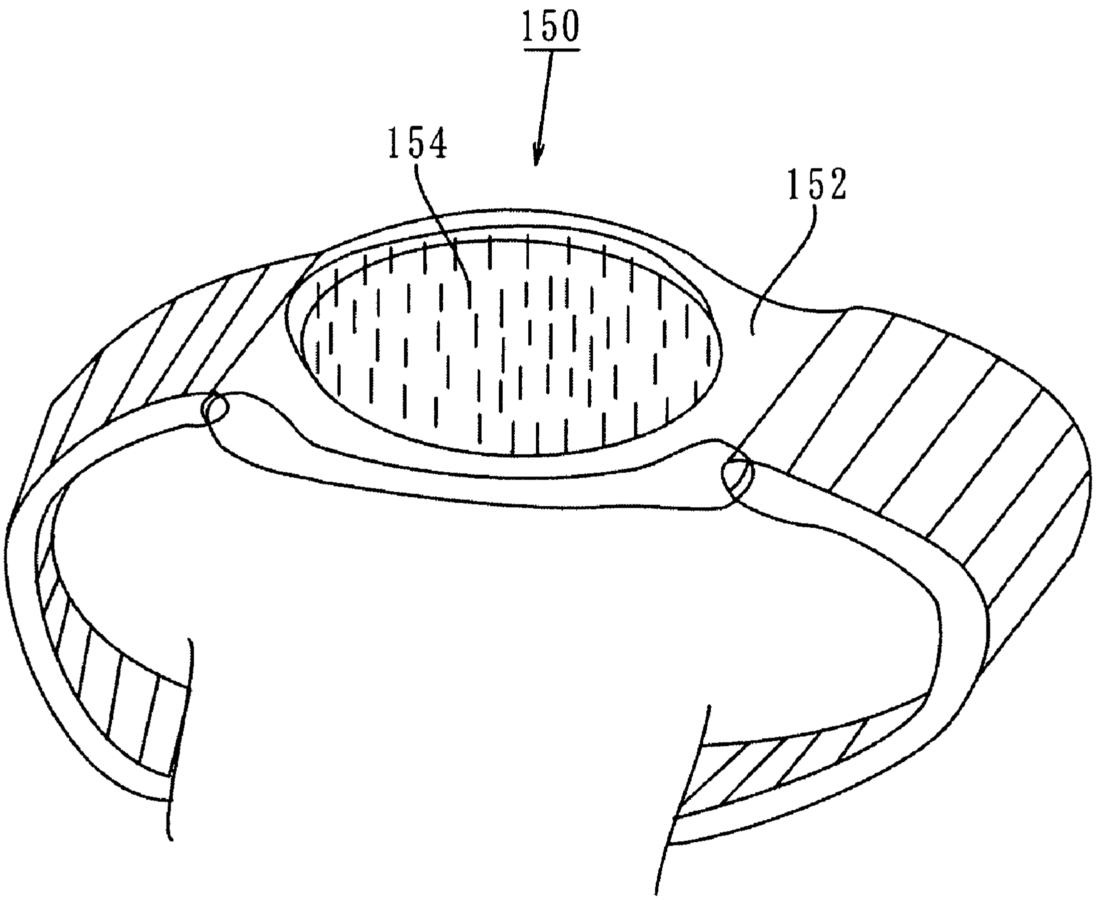
FIG. 14 is a perspective view showing a static eliminator in accordance with the 10th embodiment of the present invention.

FIG. 14 is a perspective view showing a static eliminator in accordance with 10th embodiment of the present invention. In FIG. 14 the body of eliminator 150 is accommodated in a small case 152 such as watch band type or ring type and discharge whiskers 154 are disposed so that these whiskers are oriented in a direction of opening of the small case.

Figure 15:
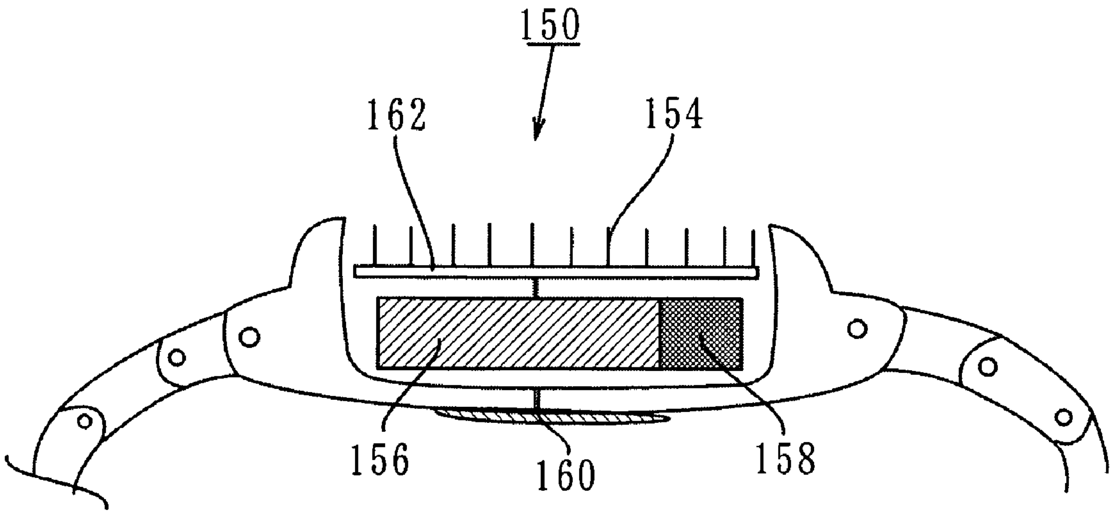
FIG. 15 is a cross sectional view showing an AC type of static eliminator in accordance with 10th embodiment of the present invention.

FIG. 15 is a cross-sectional view showing AC type of static eliminator of 10th embodiment. In FIG. 15 the static eliminator 150 comprises an electronic circuit 156 and a power supply 158 accommodated in the case 152, and a conductor 162 which is provided with electrode whiskers 162 is adapted to be applied with AC voltage through a conductor from the power supply 156. An object contact electrode 160 for making contact with the object to be discharged such as a human body or the work through a conductor from the electronic circuit 156 is provided on the outer surface of the case on the side opposite to the opening of the case.

Figure 16:
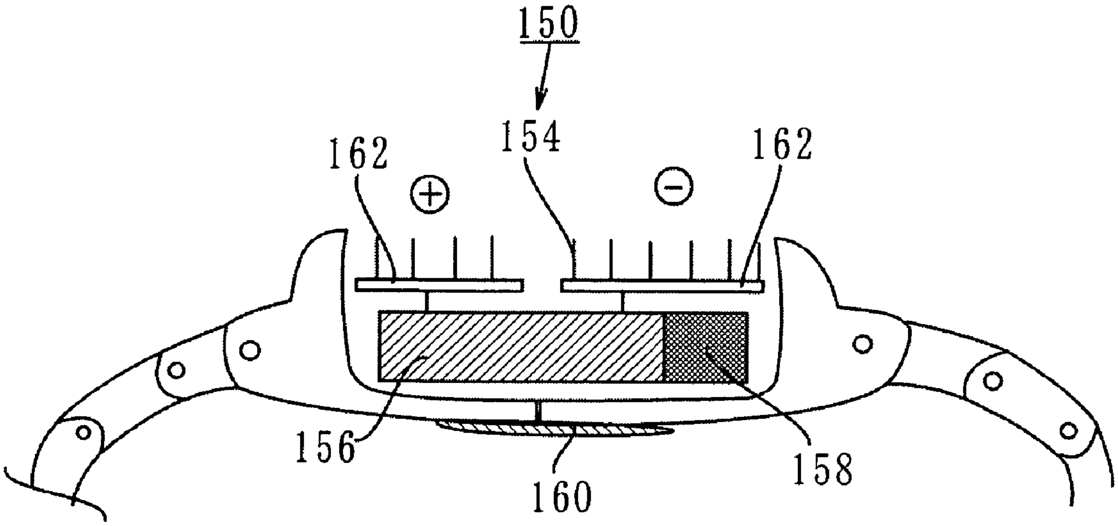
FIG. 16 is a cross sectional view showing a DC type of static eliminator in accordance with 10th embodiment of the present invention.

FIG. 16 is a cross-sectional view showing DC type of static eliminator of 10th embodiment. The embodiment is the same as that of the above-mentioned AC type of static eliminator except that the two conductors 162 and 162 provided with discharge whickers are connected to the DC power supply to be applied with plus and minus voltages.

Figure 17:
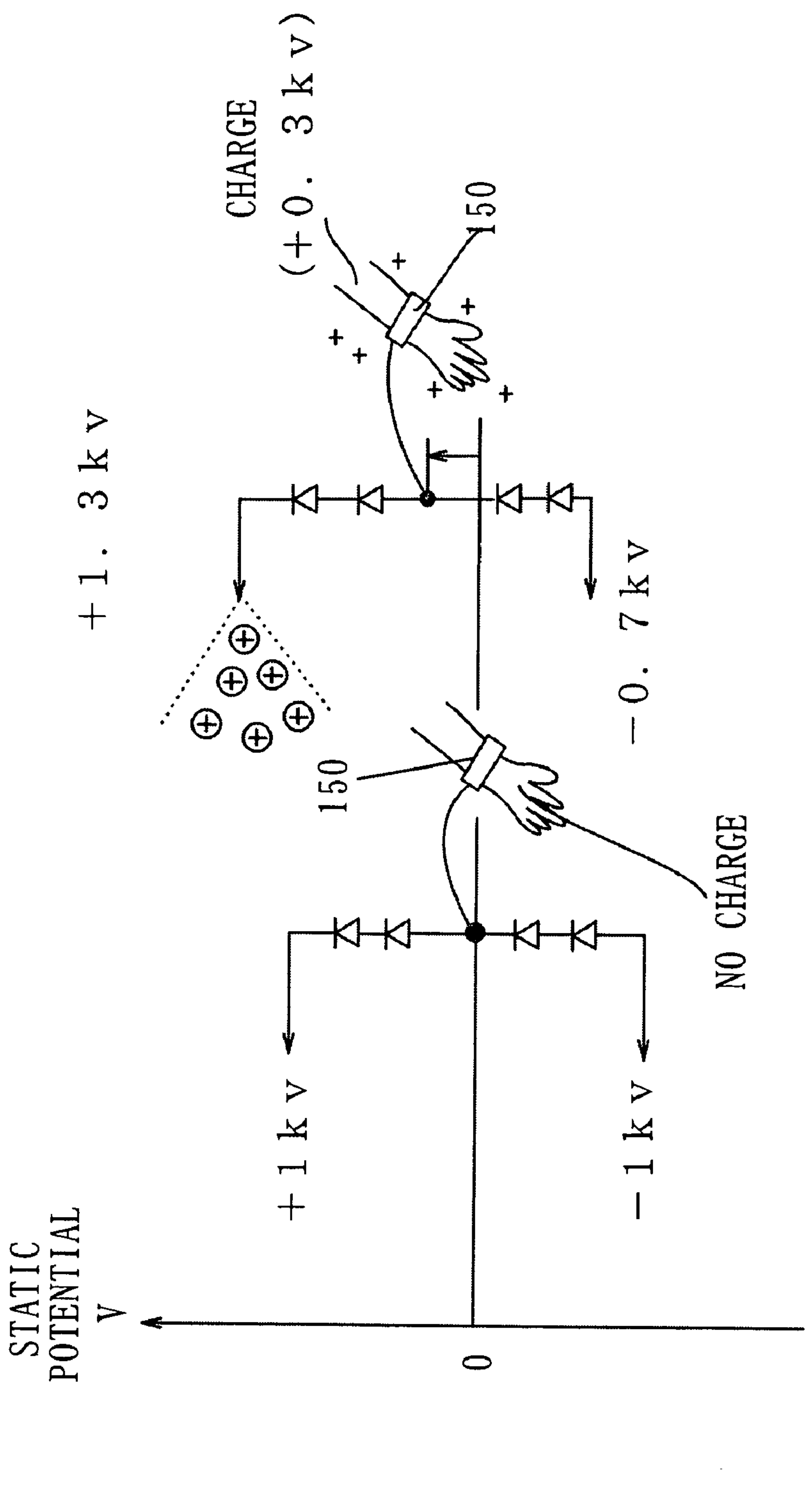
FIG. 17 is a view for explanation of principle of operation of 10th embodiment of the present invention.
Figure 18:
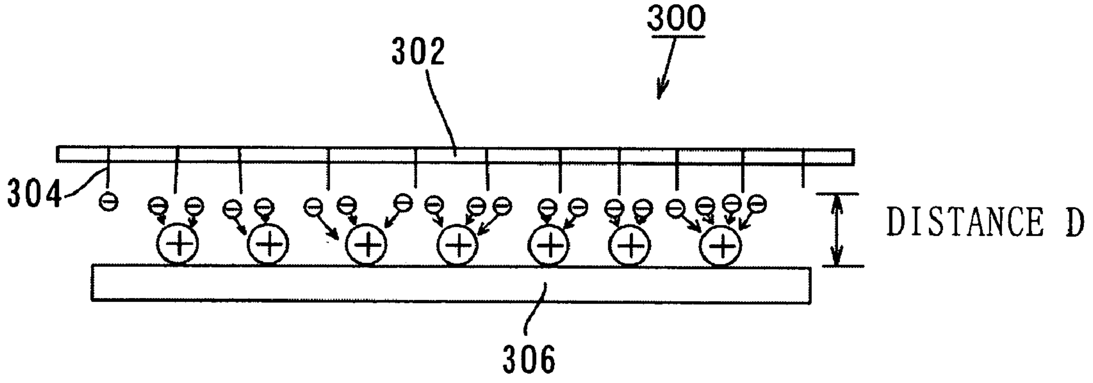
FIG. 18 is a front view showing a conventional static eliminator.

FIG. 17 is a view for explanation on principle of operation. In FIG. 17 in case that the object to be discharged such as human body bears no charge, the discharge does not occur. On the other hand when the object to be discharged is charged with, for example, plus 0.3 kV, the discharge occurs from the plus discharge whiskers applied with DC voltage of plus 1 kV to reduce the charge of the human body to substantial zero.

11th EMBODIMENT

Figure 20:
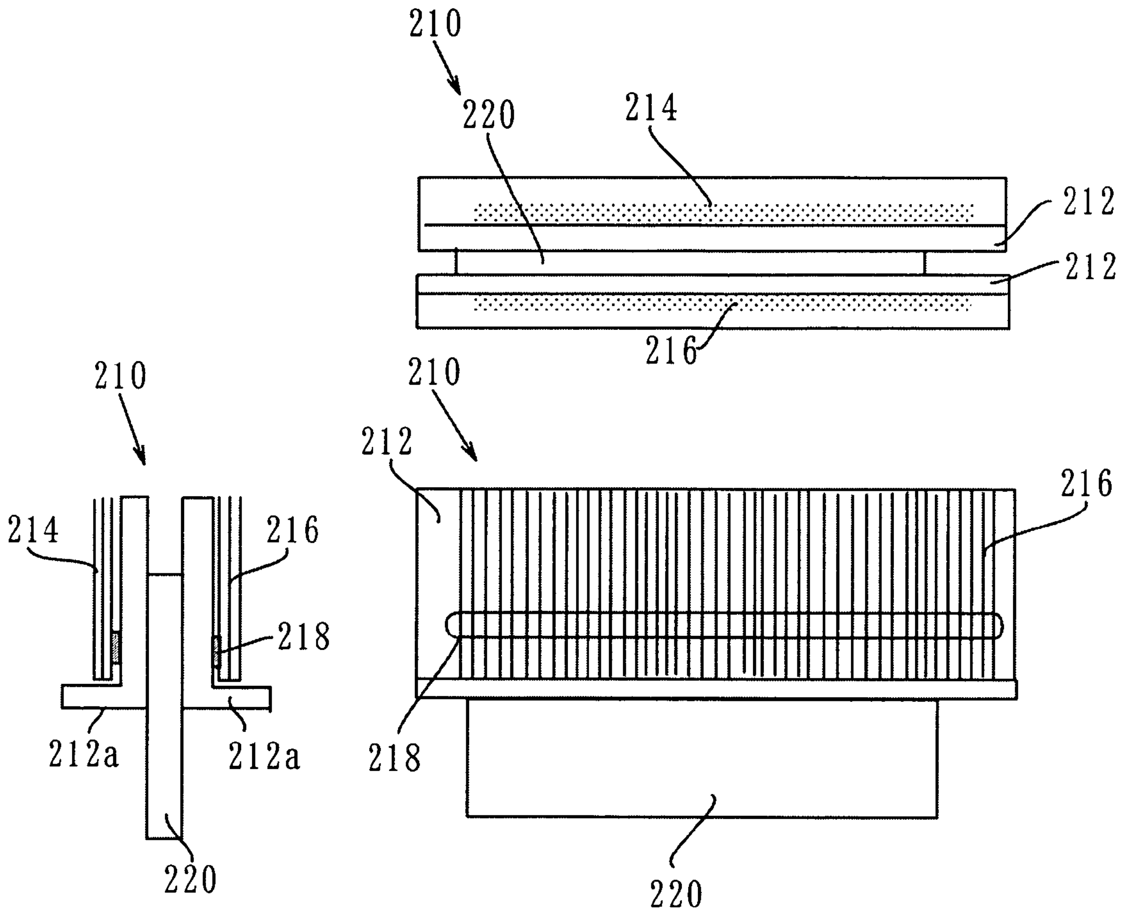
FIG. 20 is a view showing the whole of a prototype of fiber-like static eliminator in accordance with 11th embodiment of the present invention.

FIG. 20 is views (plan view, front view and side view) showing a prototype of whole fiber shaped static eliminator in accordance with the 11th embodiment of the present invention. A fiber eliminator 210 comprises a support 212 made of insulating material.

In the embodiment the support 212 comprises two support members and a mounting member 220 for mounting two support members at the opposite sides. However, the support 212 may be one piece of member or may be integral with the mounting member 220. The mounting member is used to be attached on the other member for holding the fiber eliminator, described in detail later.

A plus fiber electrode 214 and a minus fiber electrode 216 are attached to two supports 212, 212 at the outer sides thereof and are supplied with plus and minus voltages through a conducting electrode 218 from the power supply, not shown. The conducting electrode 218 equally supplies power to all discharge electrodes. The support 212 is formed with an isolation protrusion 212*a*.

As constructed above, the fiber eliminator 210 does not generate short or spark since the distance between the electrodes are maintained even if statically attracting force for attraction are acted between the plus and minus electrodes. That is, as described in detail later, insulation space distance and creepage distance for insulation between plus and minus electrodes 214 and 216 are reserved at any position such as upper portion (leading end), side portion (side end) and lower portion (bottom end) of the support 212.

12th EMBODIMENT

Figure 21:
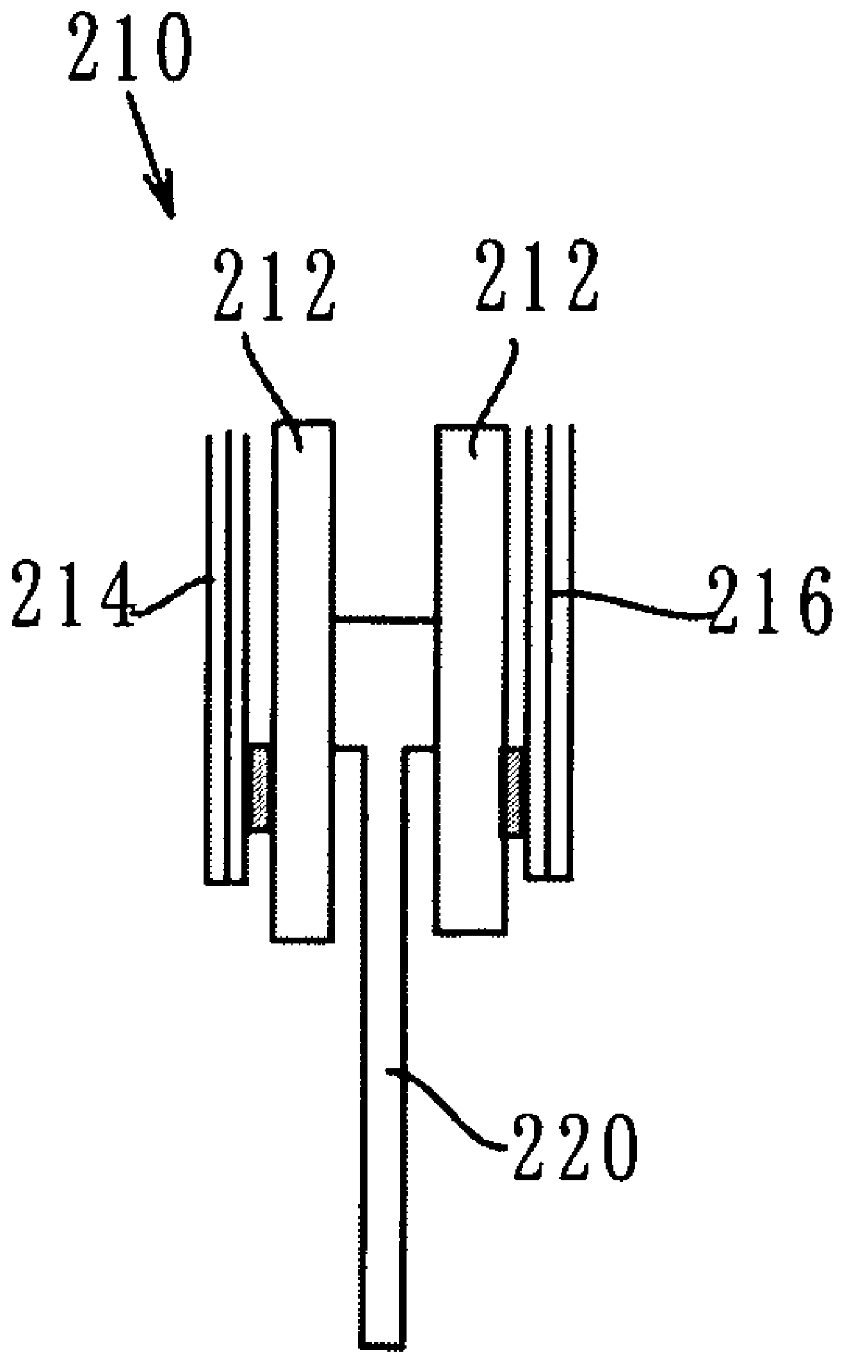
FIG. 21 shows a fiber-like static eliminator in accordance with the 12th of the present invention.

FIG. 21 shows a static eliminator in accordance with the 12th embodiment of the present invention. The static eliminator is similar to that of 11th embodiment except that no isolation protrusion 212*a* is provided. In the embodiment, if the mounting member or portion 220 is attached to a metal support, not shown in FIG. 21, electric leakage would occur since plus and minus electrodes 214 and 216 are near the metal support. Therefore, as shown in FIG. 21, it is preferable that the mounting member is made to be in the form of T to reserve creepage distance for insulation between the metal support and plus or minus electrode.

13th EMBODIMENT

Figure 22:
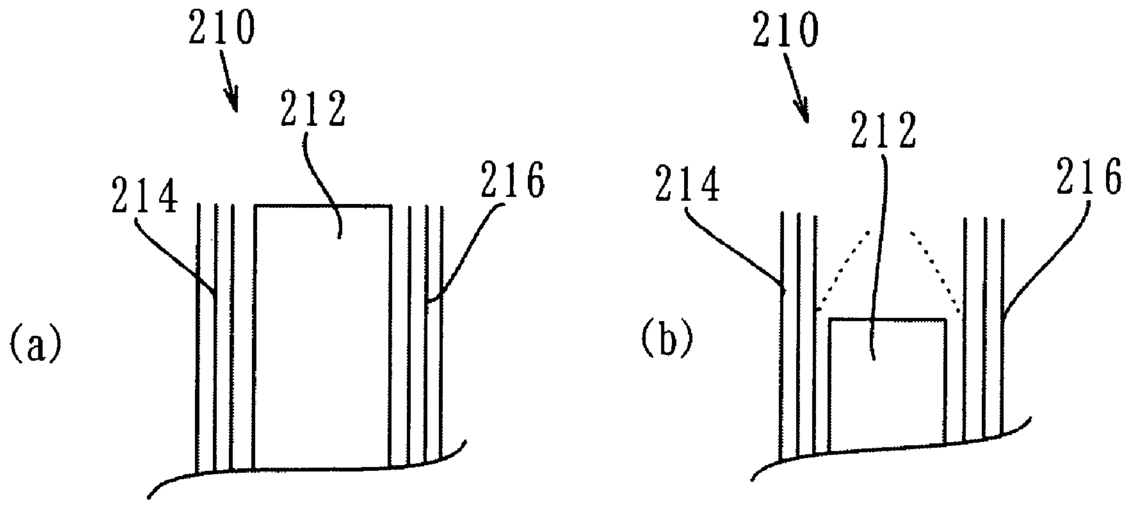
FIG. 22 shows a fiber-like static eliminator in accordance with the 13th of the present invention.

FIG. 22*a* shows a static eliminator in accordance with the 13th embodiment of the present invention and FIG. 22*b* is a view for explanation on the static eliminator in accordance with the 13th embodiment of the present invention. If, as shown in FIG. 22*b*, the leading end or upper end of support 212 is below the leading ends of discharge electrodes 214 and 216, the electrodes are attracted to each other by static force and then deformed, which results in spark or short. In order to avoid this, as shown in FIG. 22*a*, the upper end of the support 212 is made to be level with the leading ends of discharge electrodes to prevent deformation of the discharge electrodes.

14th EMBODIMENT

FIGS. 23–29 show insulation reservation means for reserving insulation between the discharge electrodes or between the fiber static eliminator and the holder on which the fiber static eliminator is mounted.

Figure 23:
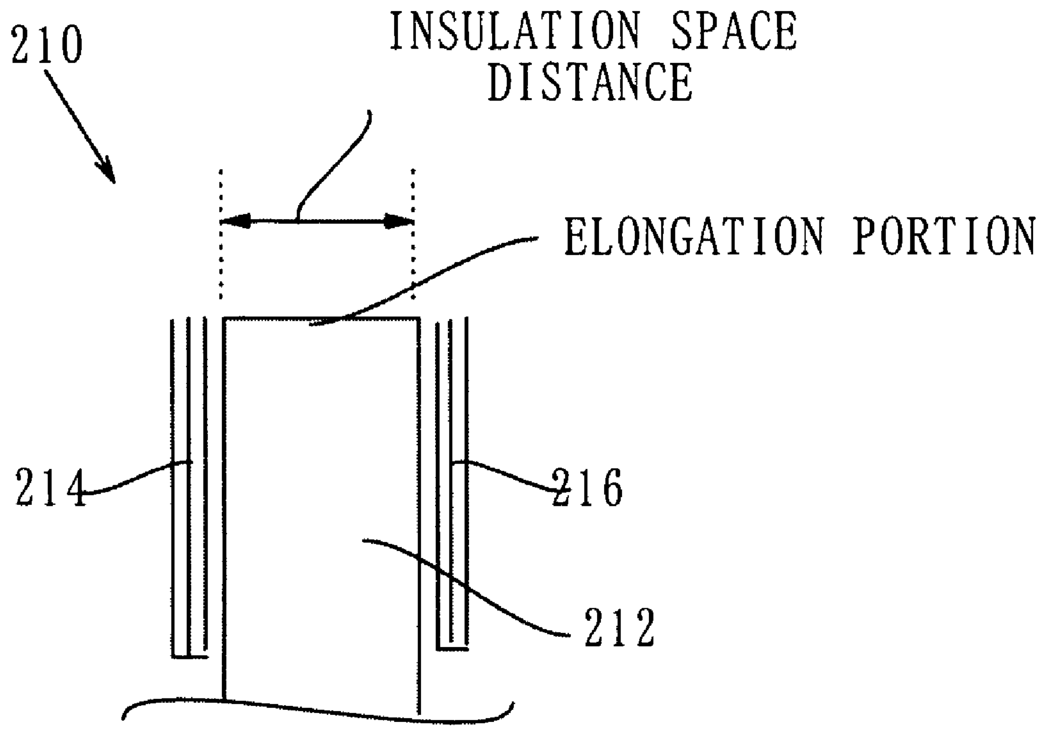
FIG. 23 shows insulation reserving means in accordance with 14th embodiment.

As shown in FIG. 23, the support 212 is provided with isolation portion at its upper end by making the support to be thick and be level with the discharge electrodes for reserving insulation.

Figure 24:
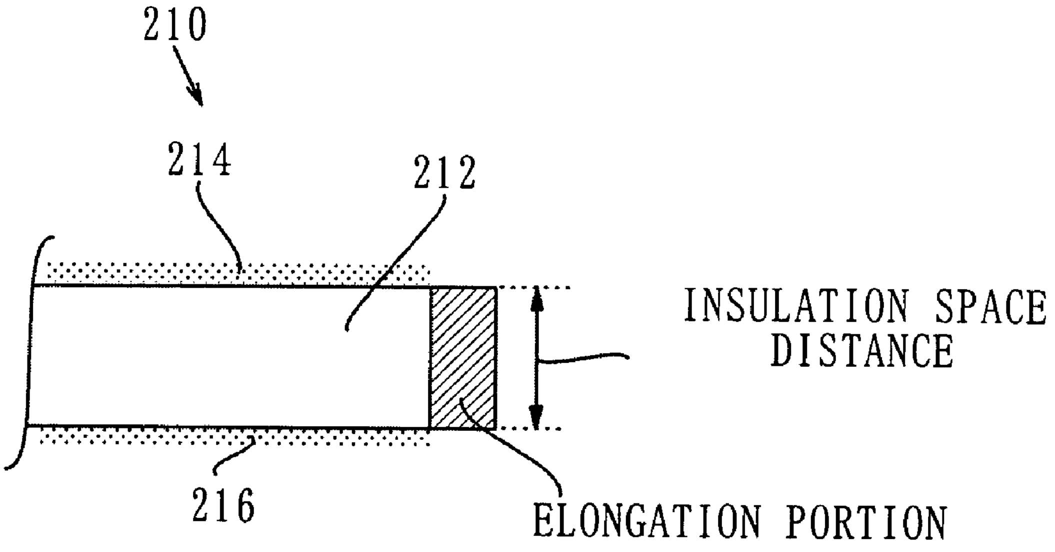
FIG. 24 shows insulation reserving means in accordance with 14th embodiment.

As shown in FIG. 24, the support 212 is made to be thick and is provided at its opposite sides with isolation portion which length is the same as that of discharge electrodes 214 and 216 or longer than that of discharge electrodes 214 and 216 for reserving insulation at its opposite end portions.

Figure 25:
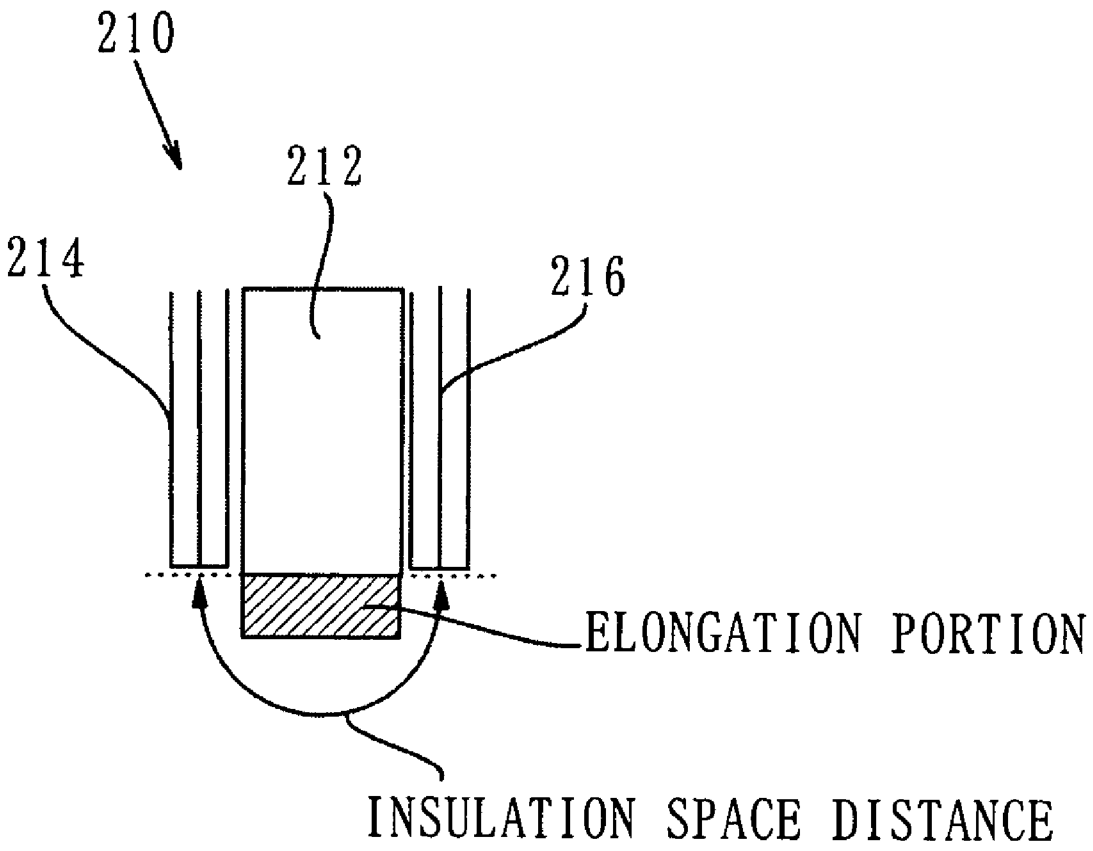
FIG. 25 shows insulation reserving means in accordance with 14th embodiment.

As shown in FIG. 25 the support 212 is made to be thick, and to be level with the discharge electrodes or to project from the bottom of the discharge electrodes for providing isolation portion at its bottom portion to reserve insulation.

Figure 26:
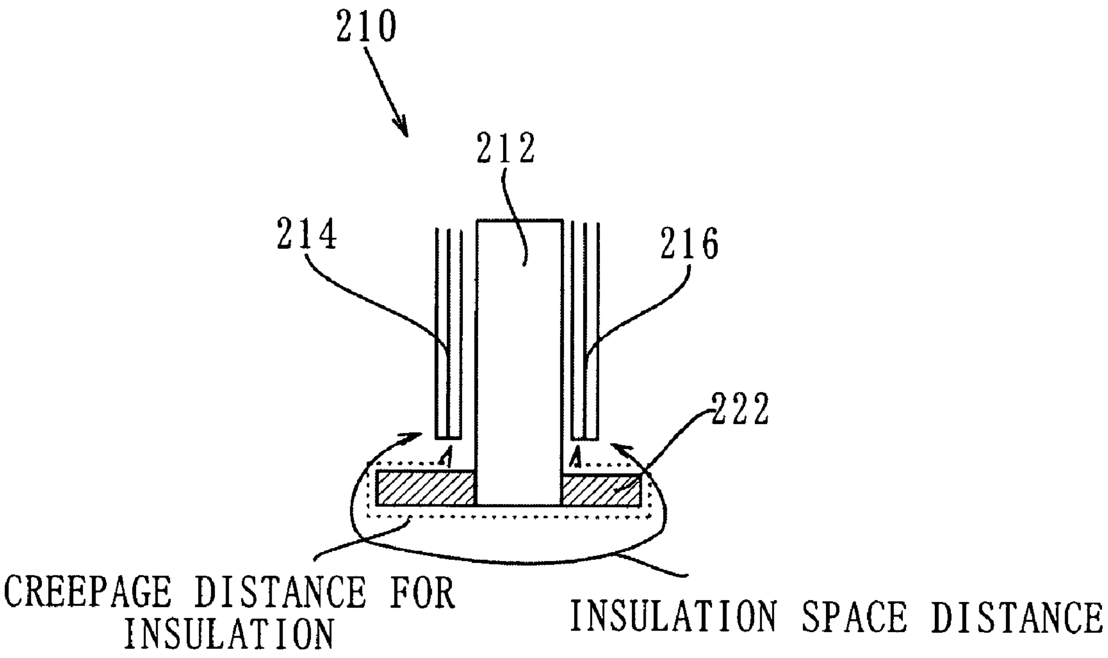
FIG. 26 shows insulation reserving means in accordance with 14th embodiment.

As shown in FIG. 26 the support 212 is provided with protrusion 222 for isolation to reserve insulation at its bottom portion.

Figure 27:
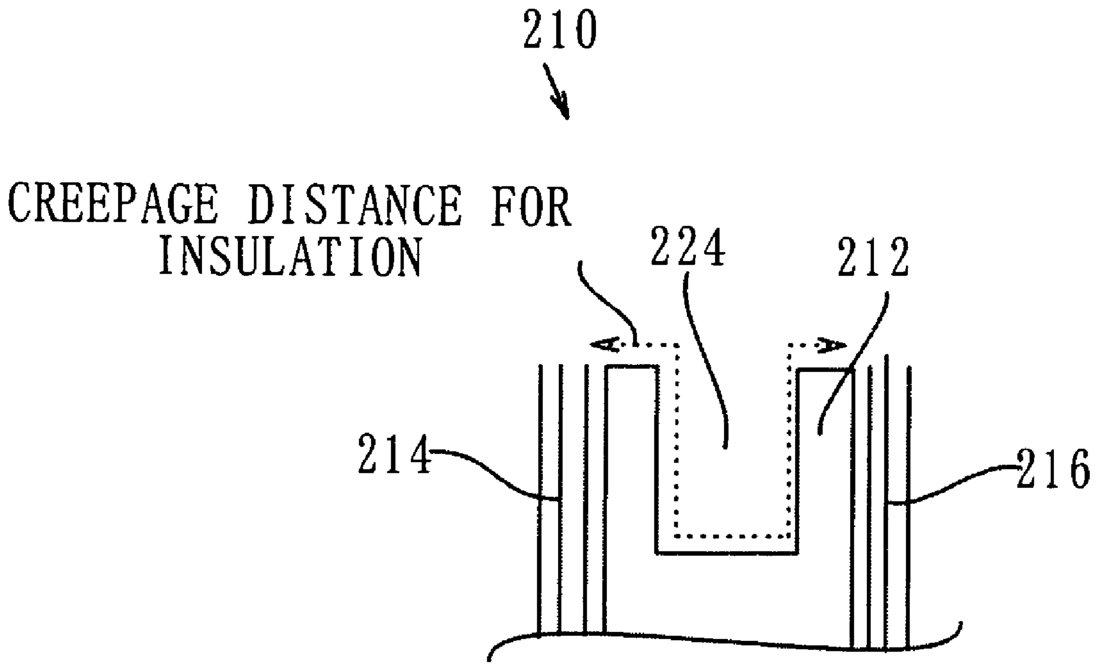
FIG. 27 shows insulation reserving means in accordance with 14th embodiment.

As shown in FIG. 27 the support 212 is formed with a groove 224 at its upper portion to reserve creepage distance for insulation.

Figure 28:
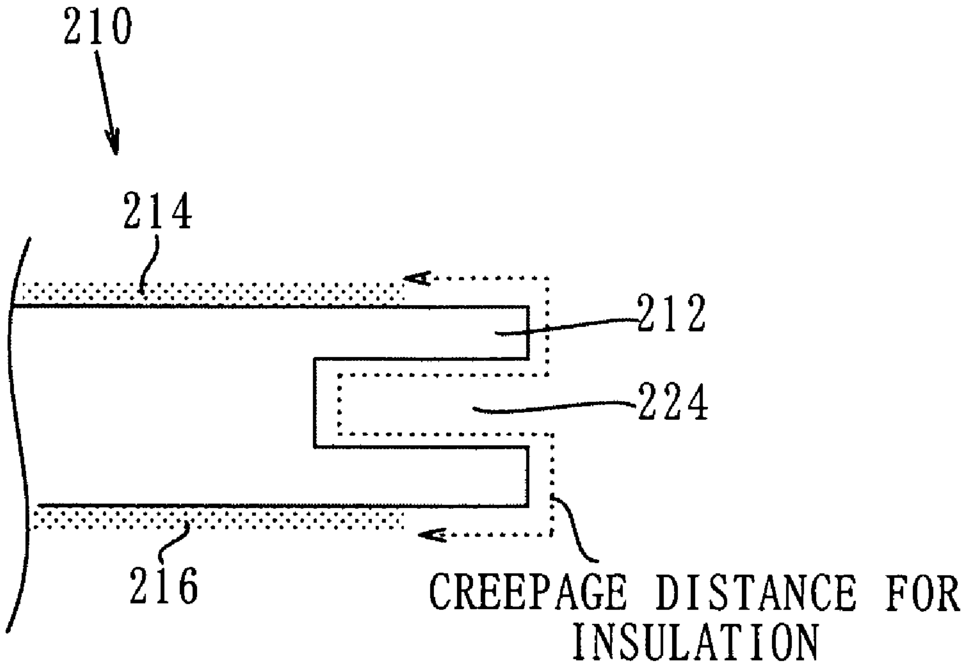
FIG. 28 shows insulation reserving means in accordance with 14th embodiment.

As shown in FIG. 28 the support 212 is formed with a groove 224 at its side portions to reserve creepage distance for insulation.

Figure 29:
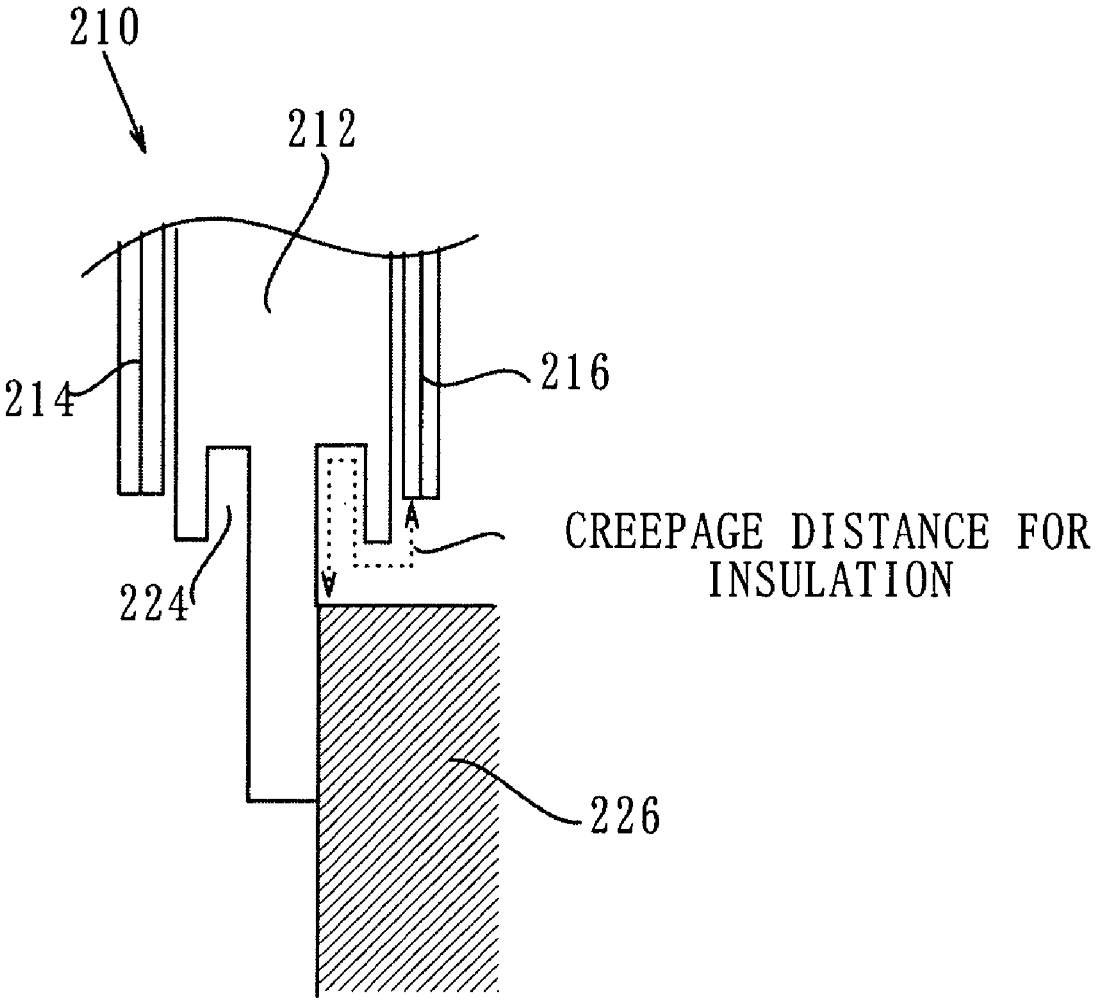
FIG. 29 shows insulation reserving means in accordance with 14th embodiment.

As shown in FIG. 29 the support 212 is formed with a groove 224 at its bottom portion to reserve creepage distance for insulation.

15th EMBODIMENT

Now referring to FIG. 20 again, the conductor electrode will be explained. Since the fiber discharge electrode material has a low resistance value near the conductor, the discharge occurs near the conductor easily and thus elimination is effective. However, since the fiber discharge electrode material has a high resistance value away from the conductor, the discharge does not easily occur away from the conductor and thus elimination is not effective. In order to avoid this each discharge electrode is connected to the conductor electrode 218 to reserve elimination performance even at the end conductor electrode.

16th EMBODIMENT

Figure 30:
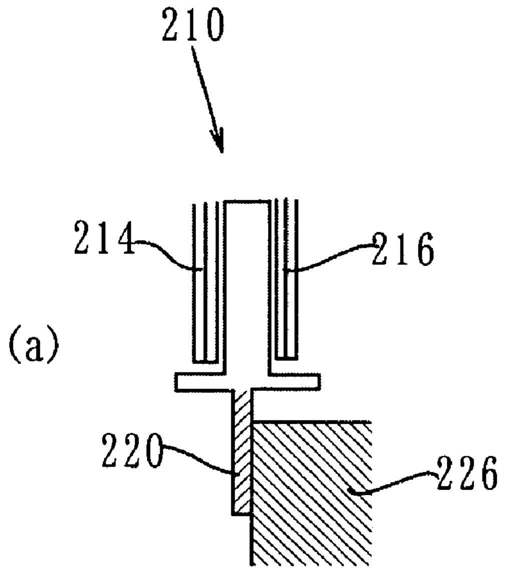
FIG. 30 is a view for explanation of attachment portion in accordance with 16th embodiment.
Figure 30:
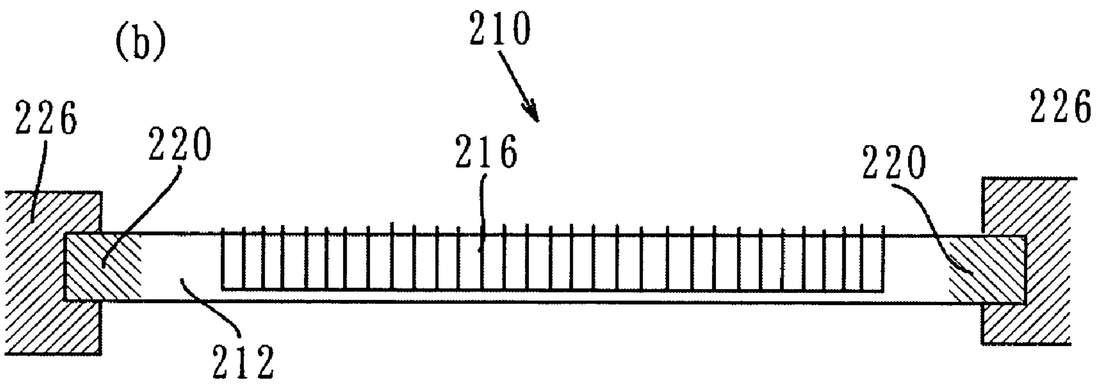
Figure 31:
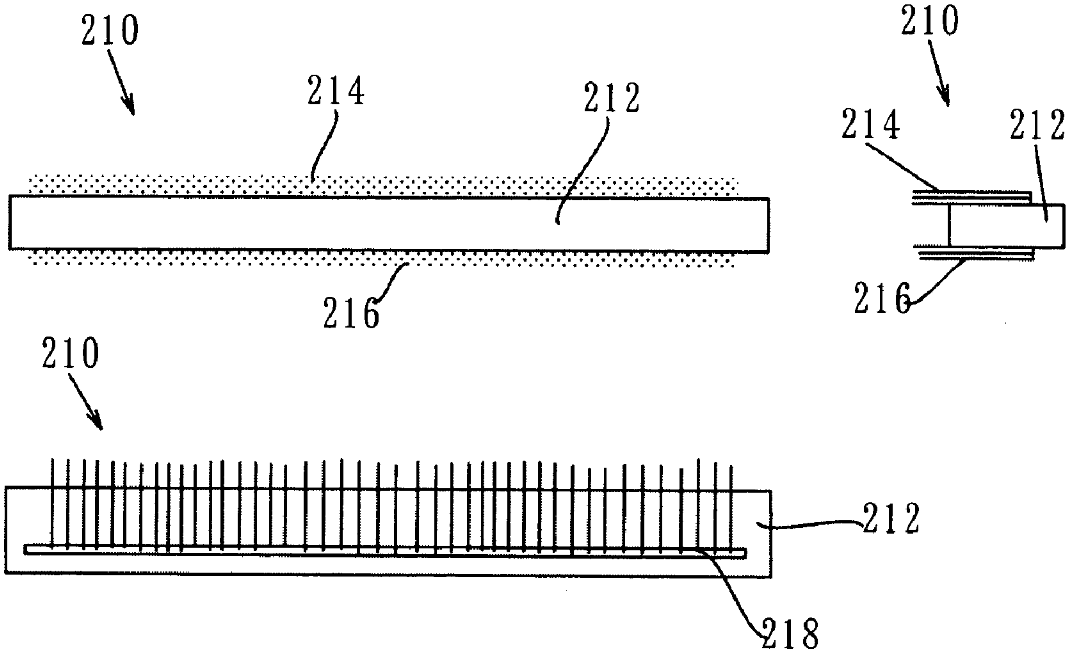
FIG. 31 is a view showing the whole of a conventional fiber-like static eliminator.

FIG. 30 is a view for explanation on mounting portion of eliminator. The conventional elimination brush is attached to the holder made of metal. Since fundamentally the elimination brush is used so as to be grounded to the earth there is no concept of insulation. The eliminator brush according to the present invention should be insulated from the environment since the eliminator is supplied with voltage although the voltage is low. Therefore, the mounting portion is necessary at the side portion or bottom portion of the eliminator.

It is understood that many modifications and variations may be devised given the above description of the principles of the invention. It is intended that all such modifications and variations be considered as within the spirit and scope of this invention, as it is defined in the following claims.

The invention claimed is:

1. A static eliminator which comprises a strip of board or tape, and a plurality of discharge electrodes disposed on the board or tape, in which the plurality of discharge electrode are disposed in parallel on the board or tape and the leading ends of the discharge electrodes are oriented in opposite directions to opposite sides of the board or tape to issue ions in opposite directions.

2. A static eliminator according to claim 1 in which each of the plurality of discharge electrodes is covered by a cover tape.

3. A static eliminator according to claim 1 in which the board or tape is made of flexible material.

4. A static eliminator according to claim 1 in which a system of power supply to the discharge electrodes is made of an electronic circuit pattern.

5. A static eliminator which comprises a strip of board or tape, and a plurality of discharge electrodes disposed on the board or tape, in which holders for holding the discharge electrodes are provided on opposite ends of the board or tape.

6. A static eliminator according to claim 5, in which the plurality of discharge electrode are disposed in parallel on the board or tape and the leading ends of the discharge electrodes are oriented in opposite directions to opposite sides of the board or tape to issue ions in opposite directions.

7. A static eliminator which comprises a strip of board or tape, and a plurality of discharge electrodes disposed on the board or tape, in which sockets for exchanging the discharge electrodes are disposed on the board or tape.

8. A static eliminator according to claim 7, in which the plurality of discharge electrode are disposed in parallel on the board or tape and the leading ends of the discharge electrodes are oriented in opposite directions to opposite sides of the board or tape to issue ions in opposite directions.

* * * * *